(12) United States Patent
Kim (10) Patent No.: US 7,650,577 B2
(45) Date of Patent: Jan. 19, 2010

(54) DIGITAL DATA RECEIVER AND METHOD FOR CONSTRUCTING SLIDESHOWS

(75) Inventor: Ha-Yun Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 337 days.

(21) Appl. No.: 11/425,355

(22) Filed: Jun. 20, 2006

(65) Prior Publication Data
US 2006/0285817 A1  Dec. 21, 2006

(30) Foreign Application Priority Data
Jun. 20, 2005  (KR)  .................... 10-2005-0052941

(51) Int. Cl.
*G06F 15/00*  (2006.01)
*G06F 13/00*  (2006.01)

(52) U.S. Cl. ..................... 715/772; 715/775

(58) Field of Classification Search ................ 715/700, 715/720, 772–773, 775–777; 725/43, 25; 348/239, 559
See application file for complete search history.

(56) References Cited

U.S. PATENT DOCUMENTS

| | | | |
|---|---|---|---|
| 2004/0223747 A1* | 11/2004 | Otala et al. | .............. 386/125 |
| 2005/0122430 A1 | 6/2005 | Lee et al. | |
| 2005/0149969 A1* | 7/2005 | Kumar et al. | .............. 725/40 |
| 2005/0155086 A1* | 7/2005 | Schick et al. | ............. 725/153 |
| 2007/0074264 A1* | 3/2007 | Vesma et al. | .............. 725/135 |
| 2007/0147793 A1* | 6/2007 | Tabuchi et al. | ............ 386/120 |

FOREIGN PATENT DOCUMENTS

| | | |
|---|---|---|
| JP | 2004-064396 | 2/2004 |
| KR | 10-2002-0074328 | 9/2002 |
| KR | 10-2003-0056085 | 7/2003 |
| KR | 10-2005-0054557 A | 6/2005 |
| KR | 10-2006-0023041 | 3/2006 |
| WO | 98/34182 | 8/1998 |
| WO | WO 2004-014073 | 2/2004 |

* cited by examiner

*Primary Examiner*—Kevin Nguyen
(74) *Attorney, Agent, or Firm*—Lee, Hong, Degerman, Kang & Waimey

(57) ABSTRACT

A method for constructing a still-image slideshow is provided. The method comprises receiving a command signal for constructing a slideshow associated with video data included in digital data received by the digital data receiver; acquiring at least one still image from the video data, in response to receiving the command signal; and constructing the slideshow based on the still image.

17 Claims, 5 Drawing Sheets

DIGITAL DATA RECEIVER AND METHOD FOR CONSTRUCTING SLIDESHOWS

CROSS-REFERENCE TO RELATED APPLICATIONS

This application claims the benefit of Korean Patent Application No. 10-2005-0052941, filed on Jun. 20, 2005, which is hereby incorporated by reference as if fully set forth herein, pursuant to 35 U.S.C. § 119(a).

FIELD OF THE INVENTION

The present invention relates to digital broadcast technology, and more particularly to a digital data receiver and method for constructing a slideshow from still images acquired from video data contained in digital broadcast data.

BACKGROUND OF TH INVENTION

In recent times, as information communication technologies and broadcast technologies have been increasingly developed and combined, a user can freely view desired digital broadcast data from anywhere he or she wishes at any time. For example, the user can view digital broadcast data at a fixed place at a fixed time, can view the digital broadcast data while in motion, or can view the digital broadcast data at a desired place at a desired time.

Particularly, an S-SMB (Satellite Digital Multimedia Broadcasting) service has begun in the Republic of Korea since May 2005. It is expected that a variety of digital broadcast services will be widely used throughout the world. Conventionally, many developers have conducted intensive research into digital broadcast technologies associated with fixed- and mobile-receivers, such that a variety of digital broadcast services for use in the fixed- and mobile-receivers are being widely used throughout the world.

For example, a DAB (Digital Audio Broadcasting) service, a DVB-T (Digital Video Broadcasting-Terrestrial) service, and a DVB-H (Digital Video Broadcasting-Handheld) service are being widely used in Europe. A Media FLO (forward Link Only) service developed by Qualcomm Corporation is being widely used in the United States, and a DMB (Digital Multimedia Broadcasting) service is being widely used in the Republic of Korea. With the widespread use of the above-mentioned digital broadcast services, terminal users can receive radio-, TV-, and teletext-broadcast services of CD-level high-quality from anywhere at any time.

In addition, users may receive not only conventional music- and TV-broadcasting services, but also other application services associated with digital broadcast technologies. The following are examples of services using the related technology: a TPEG service for providing users with traffic information in real time; a GPS service for recognizing location information of a vehicle or human being by measuring three points using a satellite; an MP3 service for transmitting CD-level audio signals received in a mobile digital broadcast receiver or a digital broadcast receiver of a vehicle to an MP3 player, such that the user can freely listen to desired MP3 music data from anywhere at any time; a slideshow service for providing a still image (e.g., a JPEG image); an R-commerce service; and a BWS (Broadcasting Website) service, etc.

As described above, the digital broadcast service can provide users with a variety of multimedia content broadcast services (e.g., education-, drama-, news-, sports-, game-, music-, and movie-contents). Therefore, the user selects desired multimedia content data from among the aforementioned contents according to his or her preference, such that the user can create a variety of new contents by editing the received content data.

Particularly, a conventional slideshow service has been designed to transmit still images from a broadcast station to the user, such that the user cannot actively construct a desired slideshow. In the meantime, the digital broadcast may comprise video data. Since the video data has a large amount of data, data compression is executed on the video data, such that the compressed video data is recorded in or transmitted to a recording medium. A representative image compression method is a Motion Picture Experts Group (MPEG) encoding method commonly defined by ISO and IEC. Also, the ITU H.261 and the ITU H.263 may also be used as other image compression methods.

In recent times, in order to obviate limitations of conventional motion picture encoding standards (e.g., H.261, H.263, and MPEG-4 Part 2), the PEG-4 Part 10 AVC (Advanced Video Coding) standard and the ITU-T Rec.H.264 standard have been newly proposed. The MPEG-4 standard has defined an I-frame (Intra-Picture), a P-frame (Unidirectionally Predicted Picture), and a B-frame (Bidirectionally Picture).

The I-frame is a reference picture of a video, and acts as a basic unit capable of constructing a picture. In other words, the I-frame is a picture capable of being encoded by corresponding picture information, and is used for random access. The P-frame is a picture created when the past picture is predicted. The B-frame is a picture created when the past picture and the future picture are predicted.

SUMMARY OF THE INVENTION

In accordance with one embodiment, a method for constructing a slideshow using a digital data receiver capable of receiving digital data is provided. The method comprises constructing a slideshow using at least one reference picture of a video (I-frame) acquired from video data included in digital data received by the digital data receiver.

In accordance with another embodiment, a method for constructing a still-image slideshow comprises receiving a command signal for constructing a slideshow associated with video data included in digital data received by the digital data receiver; acquiring at least one still image from the video data, in response to receiving the command signal; and constructing the slideshow based on the still image.

The command signal for constructing the slideshow may comprise data indicating N slides to be in the slideshow. The acquiring may comprise selecting N still images from the video data; and storing the acquired N still images in a storage medium. The command signal for constructing the slideshow may comprise data indicating a still image acquisition period.

In certain embodiments, the acquiring further comprises selecting the N still images from the video data during the still image acquisition period or encoding the N still images using a still-image compression scheme. The constructing may comprise constructing the slideshow based on the N encoded still images. The still image may for example be a reference picture of a video (I-frame). The digital data may for example comprise digital broadcast data.

In yet another embodiment, a method for constructing a still-image slideshow using a digital data receiver capable of receiving digital data comprises receiving the digital data comprising video data; receiving a command signal for constructing a slideshow associated with the video data; decoding the video data to acquire one or more still images from the decoded video data, in response to receiving the command signal; encoding the acquired still image using a predetermined still-image compression scheme; storing the encoded still images; and constructing a slideshow using the stored still images.

In one embodiment, the decoding comprises performing inverse-quantization on the video data; and performing inverse-transform on the inverse-quantized video data. The command signal for constructing the slideshow comprises data to identify number of slides to be included in the slideshow. Preferably, the still images included in the slide show are equal to the number of the slides identified in the command signal. The command signal for constructing the slideshow comprises data to indicate a still-image acquisition period. The still images are acquired from the video data during the still-image acquisition period. The one or more still images comprise at least one reference picture of a video (I-frame).

In accordance with one aspect of the invention, a digital data receiver comprises a digital data reception unit for receiving a digital data signal comprising video data; an input unit for receiving a command signal for constructing a slideshow from the video data; a controller for acquiring at least one reference picture of a video (I-frame) from the video data, and for constructing a slideshow using the at least one reference picture of a video (I-frame); and a memory unit for storing the slideshow. The command signal comprises the number of slides N to be included in the slideshow. The controller acquires at least N reference pictures of a video (I-frames), stores the acquired N reference pictures of a video (I-frames) in the memory unit to construct the slideshow.

BRIEF DESCRIPTION OF THE DRAWINGS

The accompanying drawings are included to provide a filter understanding of one or more embodiments and are incorporated in and constitute a part of this application. The drawings illustrate various embodiments and together with the description serve to explain the principle of the invention.

Reference will now be made in detail to the preferred embodiments, examples of which are illustrated in the accompanying drawings. Wherever possible, the same reference numbers will be used throughout the drawings to refer to the same or like parts.

DETAILED DESCRIPTION OF THE PREFERRED EMBODIMENTS

One or more embodiments can be applied to a variety of digital broadcast standards (e.g., mobile digital broadcast standards and fixed digital broadcast standards). Representative examples of the mobile digital broadcast standards are a European DAB (Digital Audio Broadcasting) service based on the Eureka-147, a DVB-H (Digital Video Broadcasting-Handheld) service of Europe, a Media FLO (Forward Link Only) service manufactured by Qualcomm Corporation, and a DMB (Digital Multimedia Broadcasting) service of the Republic of Korea.

The DMB service of the Republic of Korea is classified into a TDMB (Terrestrial Digital Multimedia Broadcasting) service based on the Eureka-147 and a SDMB (Satellite Digital Multimedia Broadcasting) service using satellite communication. Representative examples of the fixed digital broadcast standards are a DVB-T (Digital Video Broadcasting-Terrestrial) service of Europe, an ATSC-8VSB service of the United States, and an ISDB-T service of Japan, etc.

Figure 1:
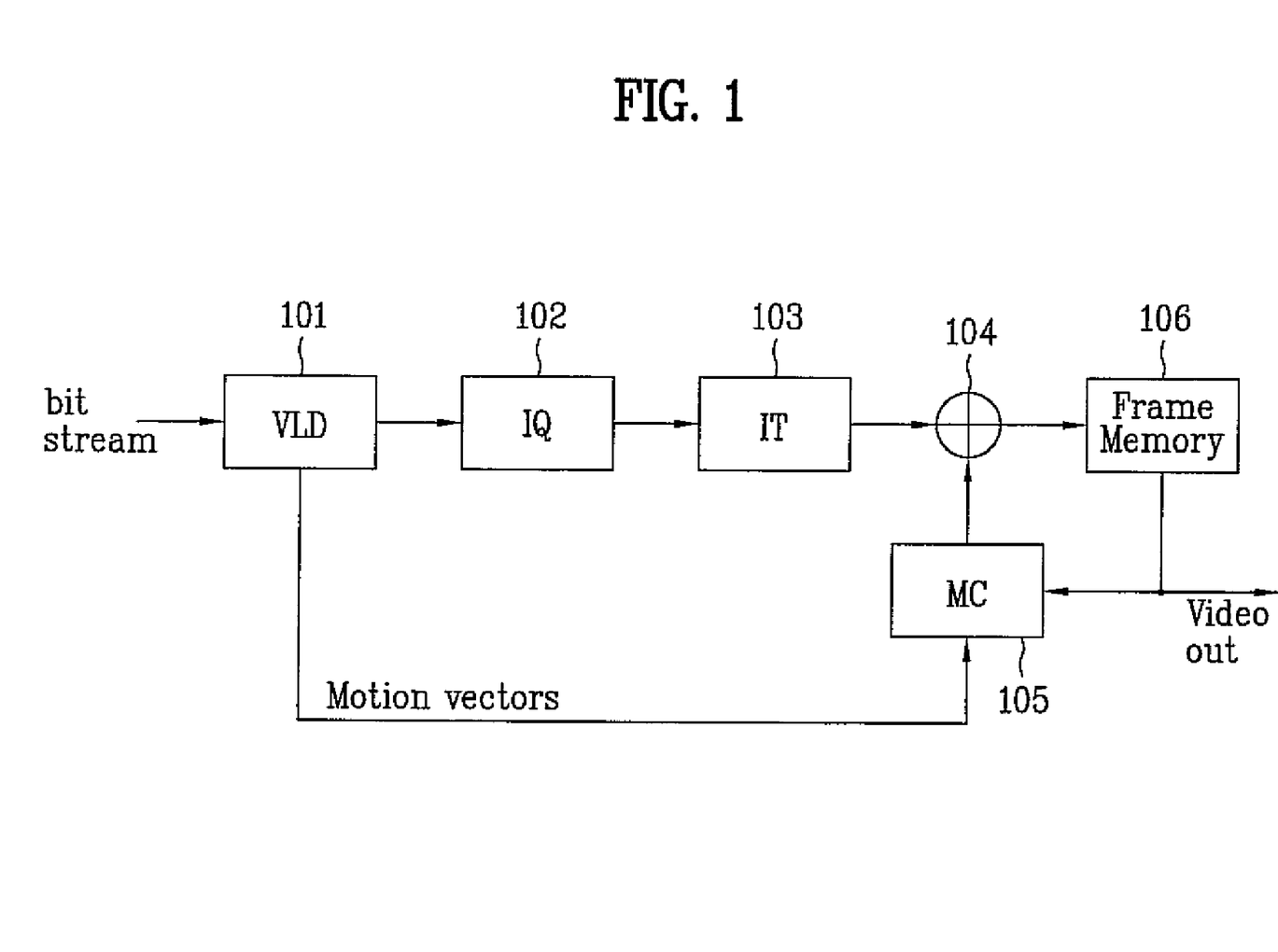
FIG. 1 is a block diagram illustrating a video decoding device contained in a digital broadcast receiver.

Referring to FIG. 1, the video decoding device contained in the digital broadcast receiver, in one embodiment, comprises a Variable Length Decoder (VLD) 101, an Inverse Quantizer (IQ) 102, an Inverse Transformer (IT) 103, an adder 104, a motion compensator (MC) 105, and a frame memory 106. The VLD 101, for example, performs variable length decoding (VLD) on a bit stream of input data, and divides the decoding result into motion vectors, quantizing values, and DCT (Discrete Cosine Transform) coefficients.

The IQ 102, for example, performs the inverse quantization of the DCT coefficients generated from the VLD 101, and outputs the inverse-quantized result to the IT 103. The IT 103 may be designed in different ways according to transform schemes of a transmission end. Representative transform schemes are a Discrete Cosine Transform (DCT), a wavelet transform, and an integer transform, etc. For example, the MPEG-4 Part 2 scheme performs the DCT, but the H.264 scheme performs the integer transform on the basis of the inverse DCT.

It should be noted that one or more embodiments will be disclosed on the basis of the DCT. The IT 103, for example, performs the Inverse Discrete Cosine Transform (IDCT) on the inverse-quantized DCT coefficients, and outputs the IDCT result to the adder 104. The adder 104, for example, adds motion-compensated data and output data of the IT 103, such that it recovers a complete video signal.

The recovered video signal is stored in the frame memory 106, for example. The recovered video signal is outputted to be displayed, and at the same time is fed back to the MC 105 for motion compensation. The MC 105, for example, receives the motion vectors from the VLD 101, receives a video signal from the frame memory 106, perform is the motion compensation on the received motion vectors and video signal, and outputs the motion compensated result to the adder 104.

The above-mentioned video decoding device of FIG. 1 has been disclosed as an example of a video decoding unit, and it is obvious to those skilled in the art that various modifications and variations of the video decoding device shown in FIG. 1 can be made in one or more embodiments without departing from the spirit or scope of the embodiments.

Figure 2:
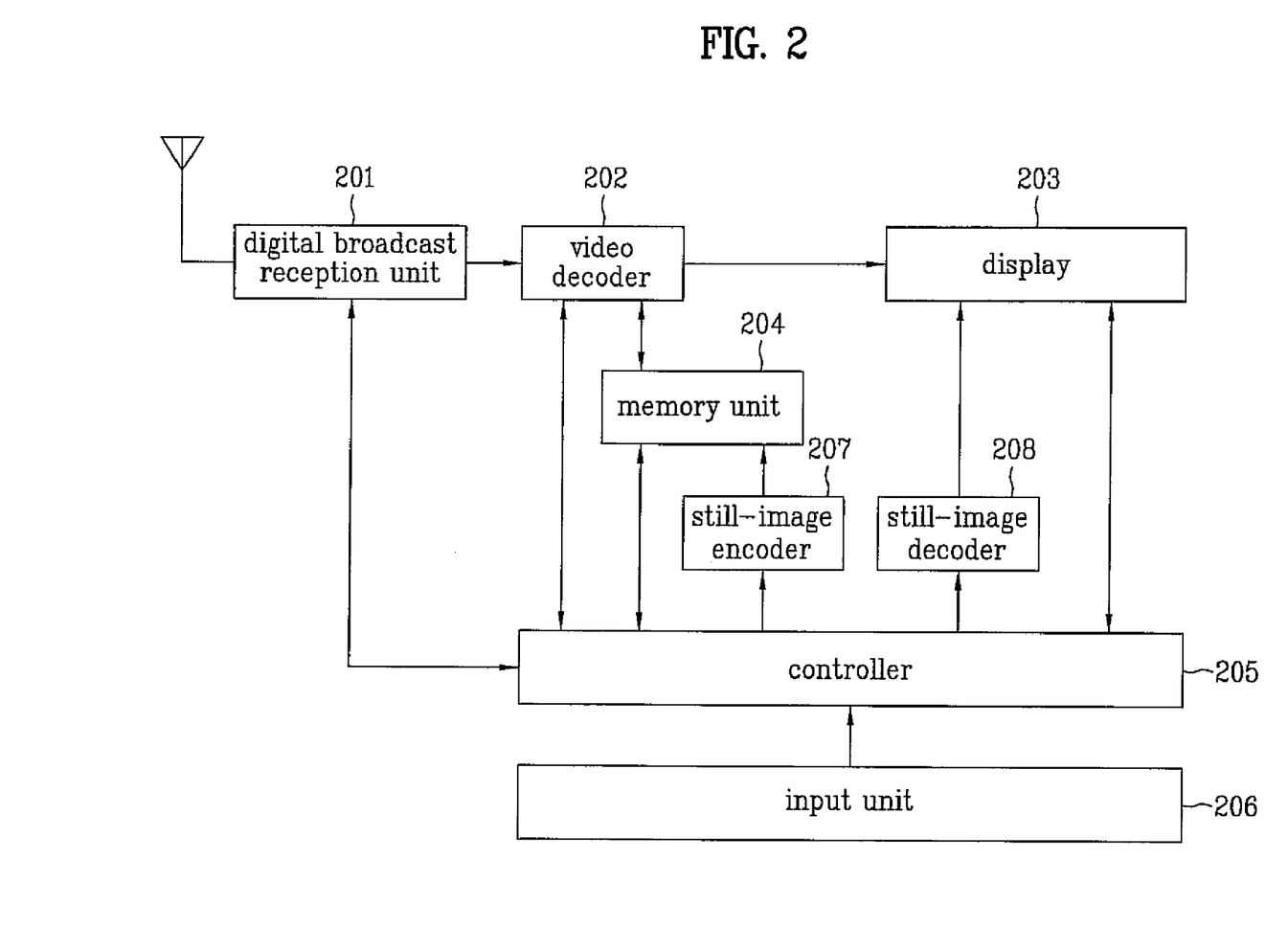
FIG. 2 is a block diagram illustrating a digital broadcast receiver in accordance with one embodiment.

FIG. 2 is a block diagram illustrating a digital broadcast receiver, in accordance with one or more embodiments. Referring to FIG. 2, the digital broadcast receiver, in accordance with one or more embodiments, comprises a digital broadcast reception unit 201, a video decoder 202, a display 203, a memory unit 204, a controller 205, an input unit 206, a still-image encoder 207, and a still-image decoder 208. The digital broadcast reception unit 201, for example, receives digital broadcast signal(s) from a broadcast station. The video data of the digital broadcast signal received in the digital broadcast reception unit 201 is encoded according to a predetermined video compression scheme, for example.

The above-mentioned video compression scheme, in one embodiment, comprises all the video compression schemes (e.g., ITU-T's H.261 and H.263, ITU/ISO's H.262 and H.264, and ISO/IEC's MPEG-1 and MPEG-4, etc.) The video decoder 202, for example, decodes encoded video data received from the digital broadcast reception unit 201, recovers an original video image, and outputs the recovered video image to the display 203. The video decoder 202 may have different configurations according to compression schemes of video signal(s) generated from the broadcast station. However, the video decoder comprises the VLD 101, the IQ 102, the IT 103, the adder 104, and the MC 105, and the frame memory 106.

The display 203, for example, displays states of the digital broadcast receiver and a variety of information. The memory unit 204, for example, stores a predetermined program for controlling overall operations of the digital broadcast receiver. When overall operations of the above-mentioned digital broadcast receiver are executed by the controller 205, the memory unit 204 stores I/O (Input/Output) data and a variety of process data, for example. The controller 205 controls overall operations of a digital broadcast terminal.

For example, the controller 205 controls the digital broadcast reception unit 201, the video decoder 202, the display 203, the memory unit 204, and the input unit 206. The input unit 206, for example, receives a variety of information and commands from a user, and may be implemented with either a keypad equipped with a variety of number/character keys or a touch-screen.

The still-image encoder 207, for example, encodes specific still-image data according to a predetermined still-image compression scheme. The still-image decoder 208, for example, corresponds to the still-image encoder 207, and decodes data encoded by the predetermined still-image compression scheme to recover an original still image. A representative still-image compression scheme is a Joint Photographic Experts Group (JPEG) encoding scheme. A digital broadcast receiver for constructing a slideshow according to a first preferred embodiment will hereinafter be described with reference to FIG. 2.

The input unit 206, for example, receives a command signal for constructing a slideshow associated with specific digital broadcast data from a user. For example, the user may select specific digital broadcast data, and may enter a command for constructing a slideshow associated with the selected digital broadcast data in the input unit 206. The command signal for constructing the slideshow may comprise the number of slides to be contained in the slideshow, for example. The number of the slides may be entered by the user, or may be determined to be a default value.

Upon receiving the command signal for constructing the slideshow from the input unit 206, the controller 205, for example, acquires the I-frames from video data of digital broadcast data received via the digital broadcast reception unit 201, and constructs the slideshow using the acquired I-frames. The controller 205, for example, stores the above-mentioned slideshow in the memory unit 204. Upon receiving a control signal from the controller 205, the video decoder 202, for example, acquires the I-frames from the video data received from the digital broadcast reception unit 201, such that it transmits the acquired result to the memory unit 204. If the command signal for constructing the slideshow comprises the number of slides to be contained in the slideshow, the controller 205, for example, controls the video decoder 202 to acquire as many I-frames as the number of slides.

The controller 205, for example, constructs the slideshow using the I-frame stored in the memory unit 204, and stores the constructed slideshow in the memory unit 204. The reason why the controller 205 needs to acquire the I-frames is that the I-frames have complete information associated with a specific image, different from the B-frames and the P-frames.

In this case, the I-frames acquired by the video decoder 202 are pictures which have not been processed by the IQ 102 and the IT 103. Therefore, in order to display the slideshow composed of several I-frames on the display 203, the decoding process of the video decoder 202 is required. In the meantime, although the controller 205 may acquire all the I-frames constructing video data contained in digital broadcast data, the above-mentioned acquisition of the controller 205 may be undesirable in consideration of storage capacity of the memory unit 204. Therefore, the controller 205, for example, may acquire the I-frames at intervals of a predetermined time.

For example, if a total playback time of the above-mentioned digital broadcast data is divided by the number of slides contained in the command signal for constructing the slideshow, the division resultant value may be an acquisition period of the I-frames. The controller 205, for example, may use a variety of algorithms to acquire some I-frames from the video data. A digital broadcast receiver for constructing a slideshow according to a preferred embodiment will hereinafter be described with reference to FIG. 2.

The input unit 206, for example, receives a command signal for constructing a slideshow associated with specific digital broadcast data from a user. For example, the user may select specific digital broadcast data, and may enter a command for constructing a slideshow associated with the selected digital broadcast data in the input unit 206.

The command signal for constructing the slideshow may comprise the number of slides to be contained in the slideshow, for example. The number of the slides may be entered by the user, or may be determined to be a default value. The command signal for constructing the slideshow may, for example, comprise a period for acquiring at least one still image (hereinafter referred to as a still-image acquisition period). The still-image acquisition period may also be determined by the user, or may be determined to be a default value.

The controller 205, for example, displays video data of digital broadcast data received via the digital broadcast reception unit 201 on the display 203. The controller 205, for example, acquires still images from the displayed video data upon receiving the command signal from the input unit 206, and constructs a slideshow using the acquired still images. The controller 205 stores the constructed slideshow in the memory unit 204, for example. The controller 205, for example, captures a specific image from among the video data displayed on the display 203, such that it acquires a still image associated with the captured image.

In one embodiment, the still images acquired by the controller 205 are indicative of completely recovered images recovered by the video decoder 202, and are acquired from the video image displayed on the display 203. In other words, the above-mentioned still image acquired by the controller 205 is processed by the video decoder 202, such that it does not depend on frame types (e.g., I-frame, B-frame, and P-frame). The controller 205 stores the above-mentioned acquired still image in the memory unit 204, for example.

If the command signal for constructing the slideshow comprises the number of slides to be contained in the slideshow, the controller 205, for example, acquires as many still images as the number of slides from the video image displayed on the display 203, and stores the acquired still images in the memory unit 204. And, the controller 205 constructs the slideshow using the stored still images. If the command signal for constructing the slideshow comprises information of the still-image acquisition period, the controller 205, for example, acquires still images from the video image displayed on the display 203 at intervals of the still-image acquisition period, stores the acquired still images in the memory unit 204, and constructs the slideshow using the still images stored in the memory unit 204.

If the command signal for constructing the slideshow comprises information indicating the number of slides and other information indicating the above-mentioned still-image acquisition period, the controller 205, for example, acquires still images from the video image displayed on the display 203 at intervals of the still-image acquisition period, until the number of acquired still images reaches the number of slides.

In the meantime, the controller 205 commands the still-image encoder 207 to encode the acquired still images using a predetermined still-image compression scheme, and stores the encoded still images in the memory unit 204, for example. And, the controller 205 may construct a slideshow using the encoded still images. In this way, if the slideshow is composed of compressed still images, memory space of the memory unit 204 can be reduced, for example. However, in order to display the compressed still images, the still-image decoder 208 must restore the compressed still images to the original still images, for example. A digital broadcast receiver for constructing a slideshow according to a third preferred embodiment will hereinafter be described with reference to FIG. 2.

The input unit 206 receives a command signal for constructing a slideshow associated with specific digital broadcast data from a user. For example, the user may select specific digital broadcast data, and may enter a command for constructing a slideshow associated with the selected digital broadcast data in the input unit 206. The command signal for constructing the slideshow, for example, may comprise the number of slides to be contained in the slideshow. The number of the slides may be entered by the user, or may be determined to be a default value. The command signal for constructing the slideshow, for example, may comprise a period for acquiring at least one still image (hereinafter referred to as a still-image acquisition period). The still-image acquisition period may also be determined by the user, or may be determined to be a default value.

The controller 205, for example, receives the command signal from the input unit 206, and decodes video data of digital broadcast data received from the digital broadcast reception unit 201, such that it acquires still images. And, the controller 205 constructs a slideshow using the acquired still images. The controller 205 stores the constructed slideshow in the memory unit 204, for example.

In this case, for example, the still images acquired by the controller 205 are indicative of completely recovered images recovered by the video decoder 202, and are acquired before they are displayed on the display 203. In other words, the still image acquired by the controller 205 is inverse-quantized by the IQ 102, and is then inverse-transformed by the IT 103, such that it recovers a complete image. Due to the complete image recovery, the controller 205 can, for example, acquire all frames regardless of I-frame, B-frame, and P-frame.

However, the controller 205 may acquire a specific still image (e.g., I-frame) to improve the efficiency of other processes and the memory capacity. If the command signal for constructing the slideshow comprises the number of slides to be contained in the slideshow, the controller 205, for example, acquires as many still images as the number of slides from the video image displayed on the display 203, and stores the acquired still images in the memory unit 204, such that it constructs the slideshow using the stored still images.

If the command signal for constructing the slideshow comprises information of the still-image acquisition period, the controller 205, for example, acquires still images from the video data at intervals of the still-image acquisition period, stores the acquired still images in the memory unit 204, and constructs the slideshow using the still images stored in the memory unit 204.

If the command signal for constructing the slideshow comprises information indicating the number of slides and other information indicating the above-mentioned still-image acquisition period, the controller 205, for example, acquires still images from the video data at intervals of the still-image acquisition period, until the number of acquired still images reaches the number of slides.

Figure 3:
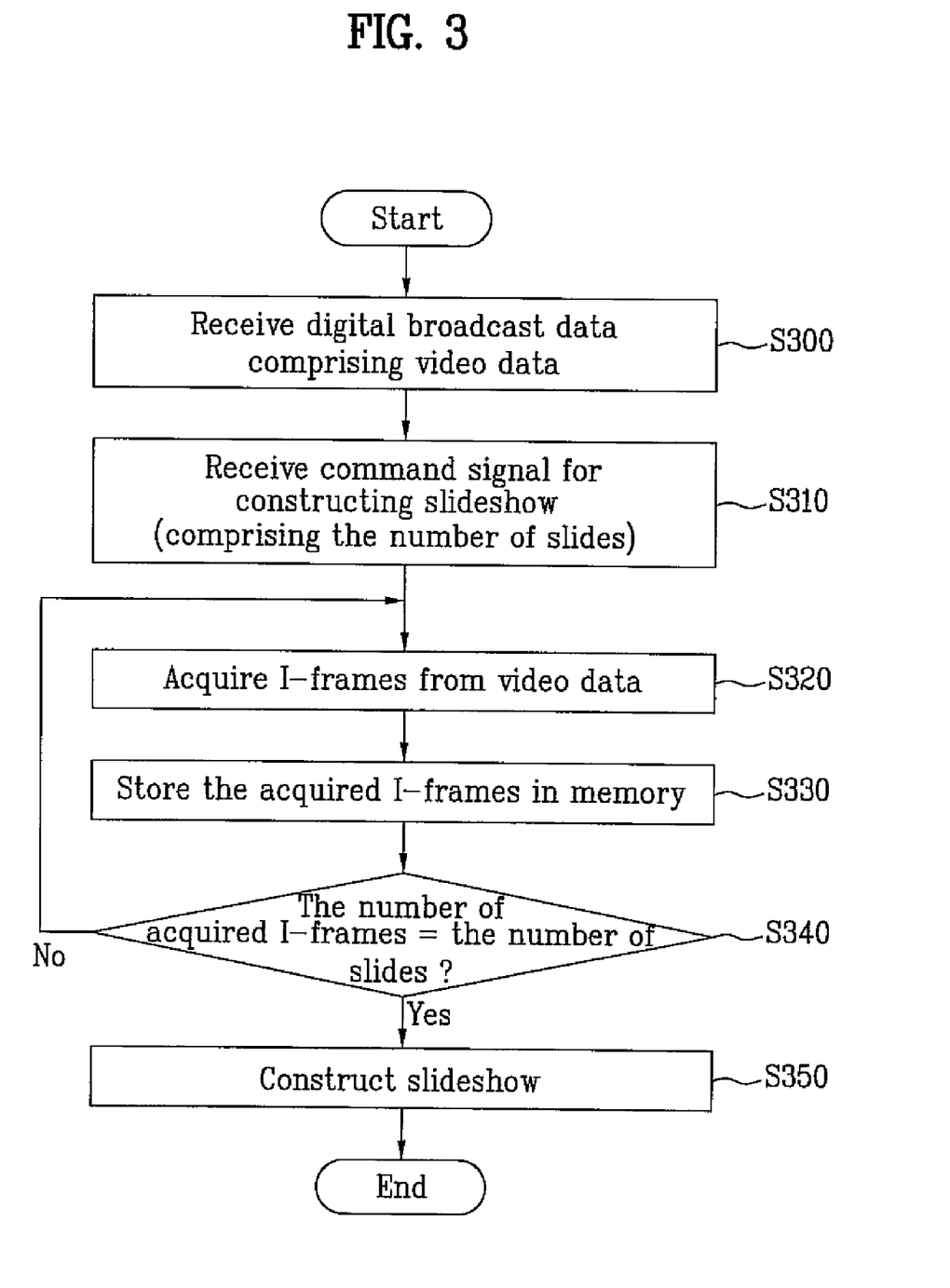
FIG. 3 is a flow chart illustrating a method for constructing a slideshow in accordance with a preferred embodiment.

In the meantime, the controller 205 commands the still-image encoder 207 to encode the acquired still images using a predetermined still-image compression scheme, and stores the encoded still images in the memory unit 204, for example. And, the controller 205 may construct a slideshow using the encoded still images. Referring to FIG. 3, the digital broadcast receiver at S300 receives digital broadcast data comprising video data. Typically, the above-mentioned video data may be encoded by a predetermined motion-picture compression scheme such as the MPEG scheme.

At S310, the digital broadcast receiver receives the command signal for constructing a slideshow of the received digital broadcast. In other words, the digital broadcast receiver at S310 receives a command for constructing the slideshow from a user. The command signal, for example, for constructing the slideshow may comprise the number of slides to be contained in the slideshow. The number of slides may be entered by the user, or may be determined to be a default value.

Upon receiving the command signal for constructing the slideshow, the digital broadcast receiver acquires the I-frames from video data of the received digital broadcast data at S320, and stores the acquired I-frames in the memory unit at S330. For example, the I-frames acquired at S320 are I-frames that have not been processed by the IQ 102 and the IT 103 of the video decoding device of FIG. 1.

At S340, the digital broadcast receiver determines whether the number of acquired I-frames is equal to the number of slides contained in the command signal for constructing the slideshow. If at S340, the number of acquired I-frames is equal to the number of slides contained in the command signal for constructing the slideshow, the digital broadcast receiver constructs the slideshow using the acquired I-frames at S350. Otherwise, if at S320, the number of acquired T-frames is different from the number of slides contained in the command signal for constructing the slideshow, the digital broadcast receiver returns to S320.

Figure 4:
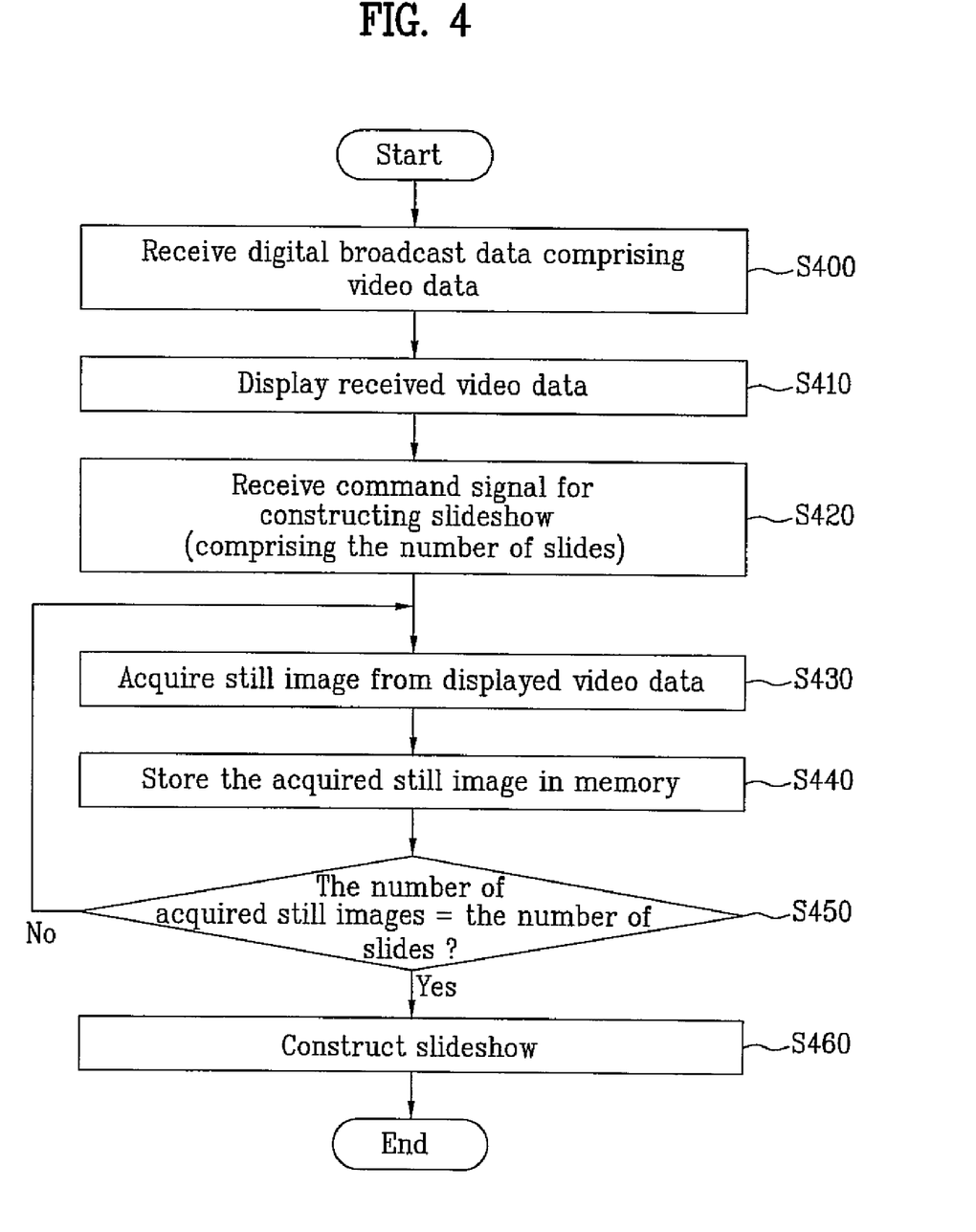
FIG. 4 is a flow chart illustrating a method for constructing a slideshow in accordance with another preferred embodiment.

FIG. 4 is a flow chart illustrating a method for constructing a slideshow in accordance with another preferred embodiment. A method for constructing a slideshow using a digital broadcast receiver, in accordance with another preferred embodiment, will hereinafter be described with reference to FIG. 4. Referring to FIG. 4, the digital broadcast receiver at S400 receives digital broadcast data comprising video data. Typically, the above-mentioned video data may be encoded by a predetermined motion-picture compression scheme such as the MPEG scheme.

At S410, the digital broadcast receiver displays the video data of the received digital broadcast data. At S420, the digital broadcast receiver receives the command signal for constructing a slideshow associated with the displayed video data. In other words, at S420, the digital broadcast receiver receives a command for constructing the slideshow associated with the displayed video data from a user.

The command signal for constructing the slideshow, for example, may comprise the number of slides to be contained in the slideshow. The above-mentioned command signal for constructing the slideshow, for example, may comprise a still-image acquisition period. The number of slides or the still-image acquisition period may be determined by the user, or may be determined to be a default value.

At S430, the digital broadcast receiver acquires still images from the displayed video data upon receiving the command signal for constructing the slideshow, and stores the constructed still images in the memory unit at S440. For example, the still images acquired at S430 are indicative of completely-recovered images recovered by the video decoder 202 of FIG. 2, and are acquired from the video images displayed on the display 203.

In the meantime, the digital broadcast receiver may encode the acquired still images using a predetermined still-image compression scheme, and may store the encoded still images in the memory unit at S440. In this way, if the acquired still images are compressed/stored, memory space of the memory unit can be reduced.

At S450, the digital broadcast receiver determines whether the number of acquired still images is equal to the number of slides contained in the command signal for constructing the slideshow. If at S450, the number of acquired still images is equal to the number of slides contained in the command signal for constructing the slideshow, the digital broadcast receiver constructs the slideshow using the acquired still images at S460. Otherwise, if at S450, the number of acquired still images is different from the number of slides contained in the command signal for constructing the slideshow, the digital broadcast receiver returns to S430.

Figure 5:
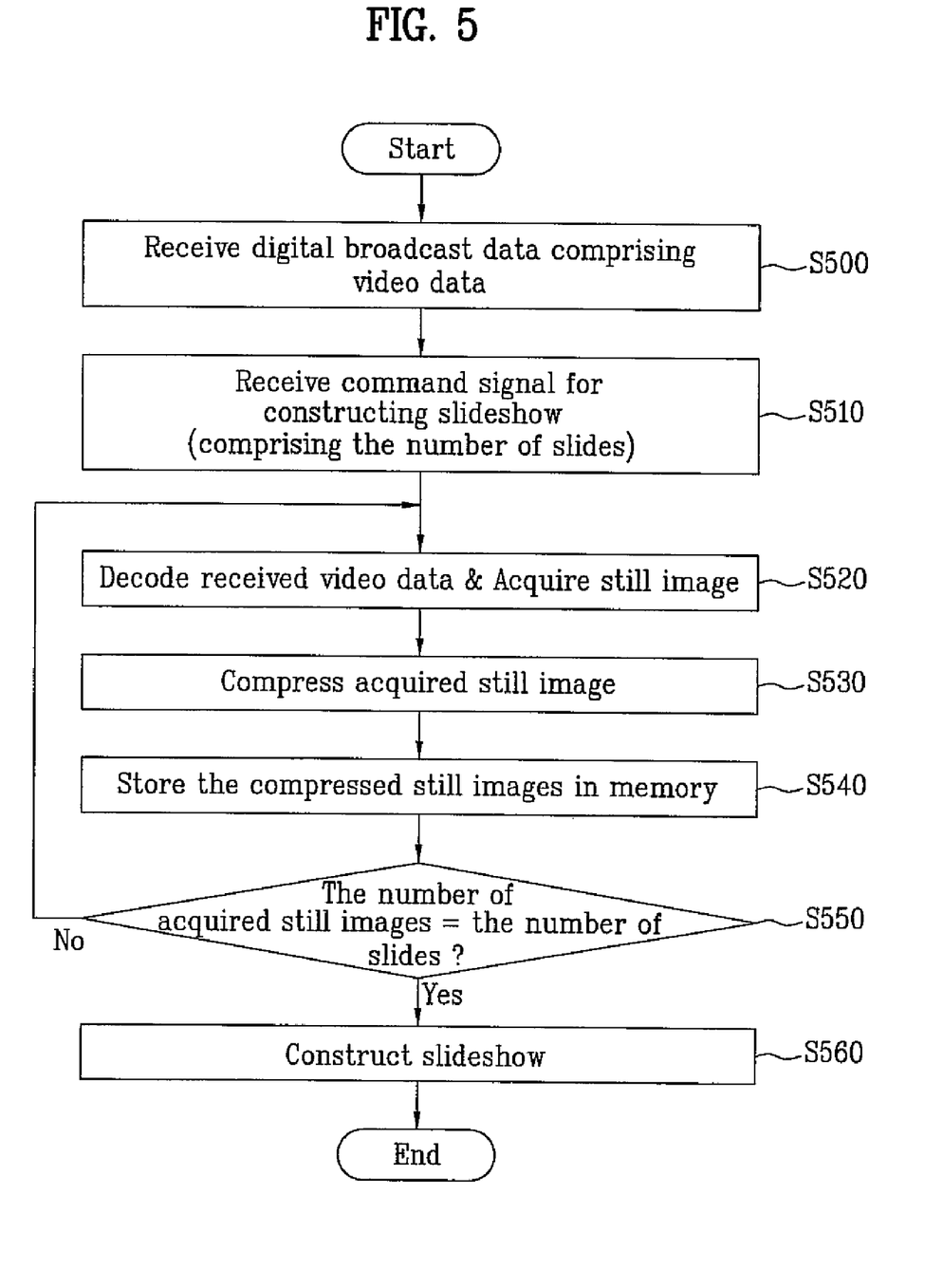
FIG. 5 is a flow chart illustrating a method for constructing a slideshow in accordance with yet another preferred embodiment.

If the command signal for constructing the slideshow comprises the still-image acquisition period, the digital broadcast receiver performs the above-mentioned blocks S430, S440, and S450 at intervals of the still-image acquisition period. FIG. 5 is a flow chart illustrating a method for constructing a slideshow in accordance with yet another preferred embodiment.

A method for constructing a slideshow using a digital broadcast receiver, in accordance with yet another preferred embodiment, will hereinafter be described with reference to FIG. 5. Referring to FIG. 5, the digital broadcast receiver at S500 receives digital broadcast data comprising video data. Typically, the above-mentioned video data may be encoded by a predetermined motion-picture compression scheme such as the MPEG scheme.

At S510, the digital broadcast receiver receives the command signal for constructing a slideshow associated with the received digital broadcast data. In other words, the digital broadcast receiver at S510 receives a command for constructing the slideshow associated with the received digital broadcast data from a user.

The command signal for constructing the slideshow, for example, may comprise the number of slides to be contained in the slideshow. Also, the command signal for constructing the slideshow, for example, may comprise a still-image acquisition period. The number of slides or the still-image acquisition period may be determined by the user, or may be determined to be a default value. In response to receiving the command signal for constructing the slideshow, the digital broadcast receiver at S520 decodes the video data contained in the received digital broadcast data, and acquires still images from the decoded video data.

At S530, the digital broadcast receiver encodes the acquired still images using a predetermined still-image compression scheme, and stores the compressed still images in the memory unit at S540. For example, the still image acquired at S520 is inverse-quantized by the IQ 102 contained in the video decoding device shown in FIG. 1, and is then inverse-transformed by the IT 103 contained in the video decoding device shown in FIG. 1, such that it recovers a complete image. In brief, the above-mentioned still images are still images acquired before they are displayed on the display 203.

In the meantime, the digital broadcast receiver at S520 may acquire specific still images (e.g., I-frames). At S550, the digital broadcast receiver determines whether the number of acquired still images is equal to the number of slides contained in the command signal for constructing the slideshow.

If at S550, the number of acquired still images is equal to the number of slides contained in the command signal for constructing the slideshow, the digital broadcast receiver at S560 constructs the slideshow using the acquired still images. Otherwise, if at S550, the number of acquired still images is different from the number of slides contained in the command signal for constructing the slideshow, the digital broadcast receiver returns to S520. If the command signal for constructing the slideshow comprises the still-image acquisition period, the digital broadcast receiver performs the above-mentioned blocks S520, S530, S540, and S550 at intervals of the still-image acquisition period.

As apparent from the above description, a digital broadcast receiver and method for constructing a slideshow, in accordance with one embodiment, acquire still images from video data contained in digital broadcast data, and construct a slideshow using the still images. It will be apparent to those skilled in the art that various modifications and variations can be made in one or more embodiments without departing from the spirit or scope of the embodiments. Thus, it is intended that one or more embodiments cover the modifications and variations of this invention provided they come within the scope of the appended claims and their equivalents.

What is claimed is:

1. A method for constructing a slideshow using a digital data receiver capable of receiving digital data, the method comprising:
   receiving digital broadcast data comprising video data;
   displaying the received video data;
   receiving a command signal for constructing a slideshow associated with the displayed video data, wherein the command signal comprises data indicating N number of still images to be in the slideshow, and wherein N is selectable by a user while the digital broadcast data is received;
   acquiring N still images from the video data, in response to the command signal, by selecting the N still images from the displayed video data;
   storing the acquired N still images in a storage medium; and
   constructing the slideshow using the N still images,
   wherein the N still images are encoded by using a predetermined still-image compression scheme.

2. The method according to claim 1, wherein the acquiring further comprises:
   decoding the video data; and
   producing the N still images based on the decoded video data.

3. method according to claim 1, wherein the command signal for constructing the slideshow comprises data indicating a still image acquisition period.

4. The method according to claim 3, wherein the acquiring comprises:
   selecting the N still images from the video data during the still image acquisition period; and
   storing the selected N still images in a storage medium.

5. The method according to claim 1, wherein the constructing comprises constructing the slideshow based on the encoded N still images.

6. The method according to claim 1, wherein the N still images comprise at least one reference picture of a video.

7. The method according to claim 1, wherein the digital data is digital broadcast data.

8. The method according to claim 1, further comprising displaying the received video data.

9. The method according to claim 8, wherein the acquiring comprises acquiring the N still images from the displayed video data.

10. The method according to claim 1, further comprising:
decoding the encoded N still images in response to input by the user to display the slideshow; and
displaying the decoded N still images on a display.

11. A digital data receiver comprising:
a digital data reception unit for receiving a digital broadcast data signal comprising video data;
a display for displaying the video data;
an input unit for receiving an input to generate a command signal for constructing a slideshow associated with the video data displayed on the display, wherein the command signal comprises data indicating N number of still images to be in the slideshow, and wherein N is selectable by a user while the digital broadcast data signal is received;
an encoder for encoding the N still images using a predetermined still-image compression scheme;
a controller for acquiring N still images from the displayed video data, in response to the command signal, and for constructing a slideshow using the N still images; and
a memory unit for storing the acquired N still images.

12. The digital data receiver according to claim 11, further comprising a decoder for decoding the video data, wherein the N still images are produced based on the decoded video data.

13. The digital data receiver according to claim 11, wherein the controller constructs the slideshow based on the encoded N still images.

14. The digital data receiver according to claim 11, wherein the N still images comprise at least one reference picture of a video.

15. The digital data receiver according to claim 11, wherein the digital data is digital broadcast data.

16. The digital data receiver according to claim 11, further comprising:
a decoder for decoding the encoded N still images in response to input by the user to display the slideshow; and
a display for displaying the decoded N still images.

17. The digital data receiver according to claim 11, further comprising a display for displaying the video data, wherein the controller is configured to acquire the N still images from the displayed video data.

* * * * *